United States Patent
Li et al.

(10) Patent No.: US 8,675,586 B2
(45) Date of Patent: Mar. 18, 2014

(54) SYSTEMS AND METHODS FOR CHANNEL TRACKING IN OFDMA

(75) Inventors: Lingjie Li, Ottawa (CA); Michael L. Moher, Stittsville (CA); Jung Yee, Ottawa (CA)

(73) Assignee: Aurora Wireless, Inc., Ottawa (CA)

( * ) Notice: Subject to any disclaimer, the term of this patent is extended or adjusted under 35 U.S.C. 154(b) by 86 days.

(21) Appl. No.: 13/297,656

(22) Filed: Nov. 16, 2011

(65) Prior Publication Data

US 2012/0127936 A1 May 24, 2012

Related U.S. Application Data (60) Provisional application No. 61/415,597, filed on Nov. 19, 2010.

(51) Int. Cl.
*H04W 4/00* (2009.01)

(52) U.S. Cl.
USPC .......................................... 370/329

(58) Field of Classification Search
None
See application file for complete search history.

(56) References Cited

U.S. PATENT DOCUMENTS

| | | | | |
|---|---|---|---|---|
| 2005/0243939 | A1* | 11/2005 | Jung et al. ..................... | 375/260 |
| 2008/0268844 | A1* | 10/2008 | Ma et al. ........................ | 455/436 |
| 2009/0141841 | A1* | 6/2009 | Dateki ........................... | 375/346 |
| 2009/0180558 | A1 | 7/2009 | Ma | |
| 2009/0201978 | A1* | 8/2009 | Tonsing et al. ............... | 375/224 |
| 2009/0213723 | A1* | 8/2009 | Noh et al. ...................... | 370/208 |
| 2009/0274174 | A1* | 11/2009 | Hwang et al. ................. | 370/480 |
| 2010/0091680 | A1* | 4/2010 | Chun et al. .................... | 370/252 |

FOREIGN PATENT DOCUMENTS

| | | |
|---|---|---|
| EP | 1389861 A1 | 2/2004 |
| WO | 2009104894 A1 | 8/2009 |

OTHER PUBLICATIONS

IEEE 802.22 Working Group of the LAN/MAN Standards Committee, "IEEE P802.22/WDv0.4.5 Draft Standard for Wireless Regional Area Networks Part 22: Cognitive Wireless RAN Medium Access Control (MAC) and Physical Layer (PHY) specifications: Policies and procedures for operation in the TV Bands," Institute of Electrical and Electronics Engineers, Inc., Jan. 2008, 355 pages.

International Search Report and Written Opinion issued on Mar. 22, 2012, in corresponding application No. PCT/CA2011/050714, 9 pages.

Galda, et al. "On the Effect of User Mobility on the Uplink of an OFDMA System", Proceedings of the 57th IEEE Semiannual Vehicular Technology Conference (VTC 2003), vol. 2, pp. 1433-1437, Apr. 2003.

\* cited by examiner

*Primary Examiner* — Chirag Shah
*Assistant Examiner* — Rina Pancholi
(74) *Attorney, Agent, or Firm* — Procopio, Cory, Hargreaves & Savitch LLP (57) ABSTRACT

Methods and systems for operating a base station communicating with one or more user terminals in an orthogonal frequency division multiple access (OFDMA) system where the one or more user terminals are configured to insert pilots in up stream bursts every nth symbol on each subcarrier, where n is an integer, are provided. The method includes identifying a needed amount of up stream bandwidth to be allocated to a user terminal; determining the subcarriers and the number of symbols per subcarrier to be allocated to meet the identified need in a burst; allocating, for the user terminal, a set of subcarriers and a number of symbols for each member of the set of subcarriers, wherein sufficient symbols per subcarrier per burst are allocated to allow user terminal to send two or more pilots per subcarrier per burst; and transmitting a message to the user terminal, the message identifying the allocated subcarriers and the number of symbols allocated for each subcarrier.

6 Claims, 5 Drawing Sheets

SYSTEMS AND METHODS FOR CHANNEL TRACKING IN OFDMA

PRIORITY CLAIM

This application claims the benefit of U.S. Provisional Patent App. No. 61/415,597, filed on Nov. 19, 2010, titled "Systems And Methods For Channel Tracking In OFDMA," the entirety of which is hereby incorporated herein by reference.

FIELD OF THE INVENTION

The present invention pertains generally to communication systems using orthogonal frequency division multiple access (OFDMA), and to upstream channel tracking in OFDMA wireless communication systems.

BACKGROUND

In a point-to-multipoint wireless communication system, a base station (BS) communicates with multiple customer premise equipments (CPEs) or user terminals. The data transmission from the BS to a CPE is called the downstream (DS) and the data transmission from a CPE to the BS is called the upstream (US).

Orthogonal frequency division multiple access (OFDMA) is a popular multiple access approach widely used in wireless communication systems including 802.16 WiMAX and 802.22 WRAN. OFDMA uses orthogonal frequency multiplexing (OFDM) as the modulation method. In OFDM the channel bandwidth in the frequency domain is divided into multiple orthogonal narrow band channels (subcarriers). The sharing of transmission resources in OFDMA among multiple CPEs is two dimensional: a subcarrier can be assigned to a CPE for a number of symbols, and each CPE can be assigned one or more modules (bursts) in the subcarrier by symbol plane (i.e., in the time-frequency two-dimensional plane). In the DS, preambles are used at the beginning or middle of the symbol transmissions. These preambles serve purposes such as synchronization, channel estimation and correction. Values known to both the transmitter and the receivers are also transmitted at specific pilot subcarriers to provide better channel tracking and correction capabilities. In the US, a preamble is not transmitted by a CPE to the BS. The BS usually relies on the pilots transmitted by a CPE to estimate the channel.

SUMMARY

In one embodiment a wireless device is provided which sends data to user terminals on a down stream (DS) and receives data from user terminals on an up stream (US). The device includes a transceiver which transmits and receives information with a plurality of user terminals using orthogonal frequency division multiple access (OFDMA). The device further includes a controller configured to allocate US bursts to the one or more user terminals, the controller allocating a particular set of subcarriers for a particular number of symbols for each of the one or more user terminals and allocating sufficient symbols per subcarrier per burst to allow each of the one or more user terminals to send two or more pilots per subcarrier per burst.

In another aspect the controller is further configured to extract the pilots from a subcarrier in a burst and compare a transfer function estimate for each of the two or more pilots. In addition each of the one or more user terminals is configured to transmit a pilot on each subcarrier every n symbols and the controller is configured to allocate at least m*n symbols for each subcarrier in an US burst, where m is a positive integer.

In a further aspect the controller is further configured to calculate a channel transfer function estimate based on each pilot received for each subcarrier during a burst and compare the estimates over the burst to determine if the channel has changed over the course of the burst. In addition the controller can be further configured such that if the comparison indicates that the channel is changing within the burst, the controller adjusts the channel transfer function over time for that subcarrier.

In another aspect a method for operating a base station communicating with one or more user terminals in an orthogonal frequency division multiple access (OFDMA) system where the one or more user terminals are configured to insert pilots in up stream (US) bursts every nth symbol on each subcarrier, where n is an integer, is provided. the method includes identifying a needed amount of US bandwidth to be allocated to a user terminal; determining the subcarriers and the number of symbols per subcarrier to be allocated to meet the identified need; allocating at least m*n symbols for each determined subcarrier in an US burst, where m is a positive integer; and transmitting a message to the user terminal, the message identifying the determined subcarriers and the number of symbols allocated for each determined subcarrier.

In a further aspect identifying a needed amount of US bandwidth includes receiving a bandwidth request from the user terminal.

In another aspect the method includes receiving a transmission from the user terminal on the determined subcarriers; calculating a channel transfer function estimate based on each pilot received on each determined subcarrier during a burst; and comparing the estimates over the burst to determine if the channel has changed over the course of the burst.

In a further aspect, when the comparison indicates that the channel is changing within the burst, the channel transfer function is adjusted.

In another aspect the method includes receiving a transmission burst from the user terminal on the determined subcarriers; extracting two or more pilots from each of the determined subcarriers in the burst; and comparing a transfer function estimate for each of the two or more pilots.

In a further aspect a method for operating a base station communicating with one or more user terminals in an orthogonal frequency division multiple access (OFDMA) system where the one or more user terminals are configured to insert pilots in up stream (US) bursts every nth symbol on each subcarrier, where n is an integer, is provided. The method includes identifying a needed amount of US bandwidth to be allocated to a user terminal; determining the subcarriers and the number of symbols per subcarrier to be allocated to meet the identified need in a burst; allocating, for the user terminal, a set of subcarriers and a number of symbols for each member of the set of subcarriers, wherein sufficient symbols per subcarrier per burst are allocated to allow user terminal to send two or more pilots per subcarrier per burst; and transmitting a message to the user terminal, the message identifying the allocated subcarriers and the number of symbols allocated for each subcarrier.

These and other capabilities and advantages of embodiments of the invention will be more fully understood after a review of the accompanying figures and the detailed description.

BRIEF DESCRIPTION OF THE DRAWINGS

The details of the present invention, both as to its structure and operation, may be gleaned in part by study of the accompanying drawings, in which like reference numerals refer to like parts, and in which.

DESCRIPTION OF THE INVENTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
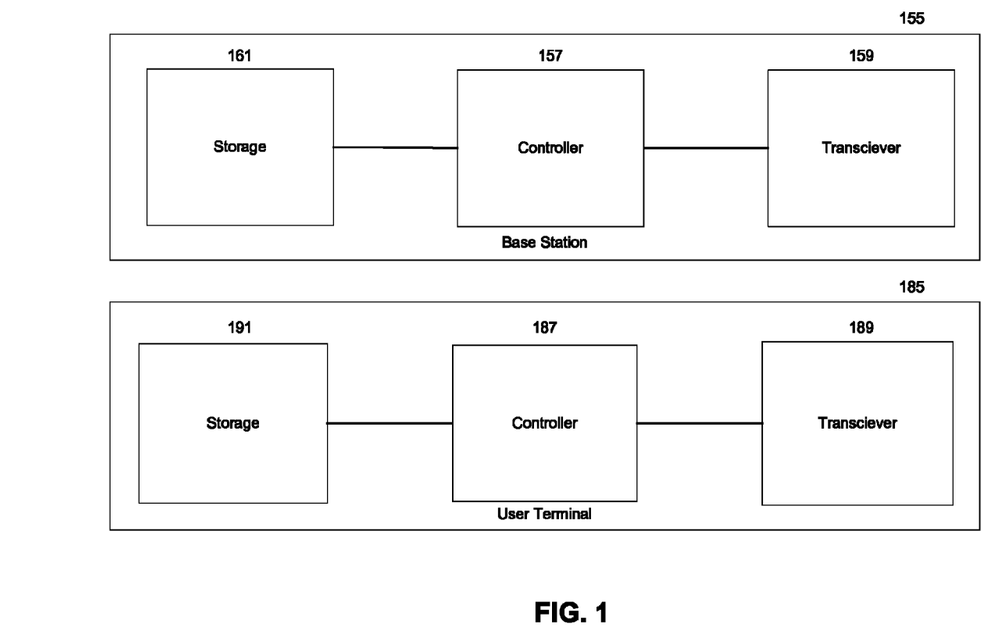
FIG. 1 is a functional block or module diagram of a point-to-multipoint wireless communication system.

FIG. 1 is a functional block or module diagram of a point-to-multipoint wireless communication system, where each module represents a functional block or module of the system. The system includes an access point such as a base station (BS) 155 and multiple customer premise equipments (CPEs), such as the CPE 185. The CPEs can also be referred to as user terminals. The CPEs can be various types of computer devices such as mobile telephones, personal computers and other types of computer devices. The data transmission from BS 155 to a CPE 185 is called the downstream (DS), the data transmission from a CPE 185 to the BS 155 is called the upstream (US). These communication links can be wired or wireless.

OFDMA is a popular multiple access approach widely used in wireless communication systems including 802.16 WiMAX and 802.22 WRAN. OFDMA uses orthogonal frequency multiplexing (OFDM) as the modulation method, where the channel bandwidth in the frequency domain is divided into multiple orthogonal narrow band channels (subcarriers). The sharing of transmission resources in OFDMA among multiple CPEs is two dimensional: a subcarrier can be assigned to a CPE for a number of symbols, and each CPE can be assigned one or more modules (bursts) in the subcarrier by symbol plane (i.e., in the time-frequency two-dimensional plane). This is shown in FIGS. 2 and 3.

Figure 2:
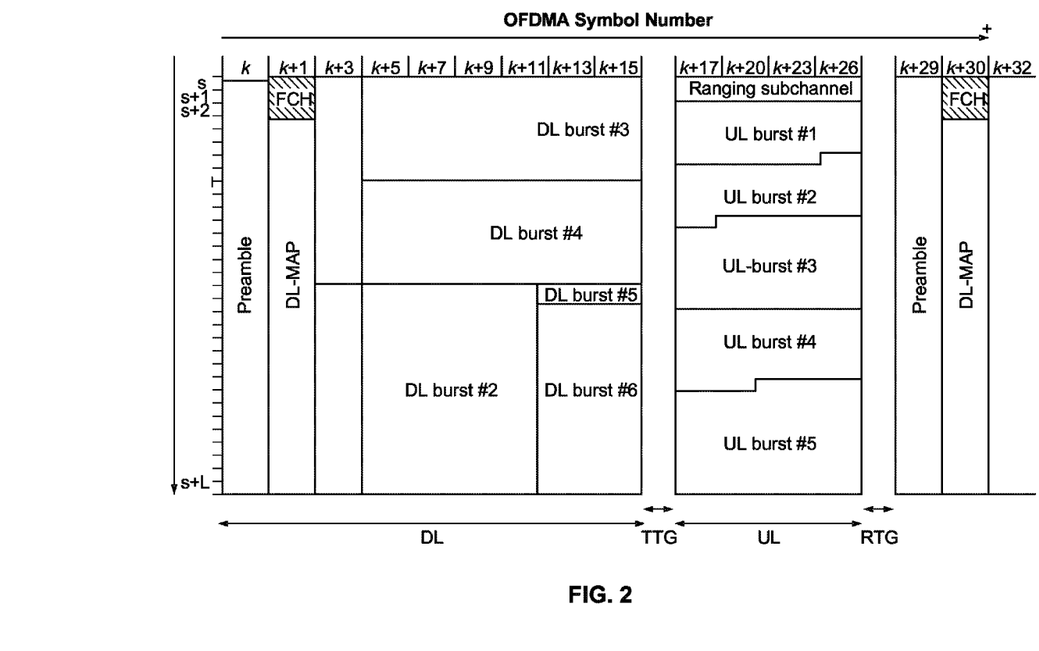
FIG. 2 illustrates the structure of an example frame.
Figure 3:
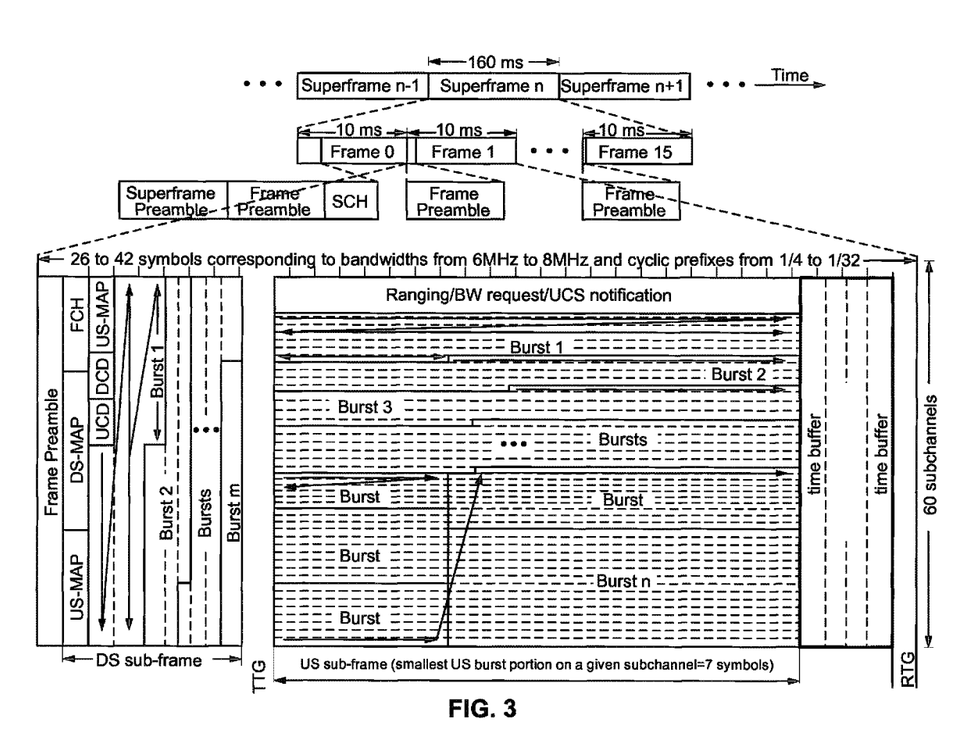
FIG. 3 illustrates the structure of an alternative example frame.

FIG. 2 illustrates the structure of an example frame according to the 802.16 WiMAX standard. FIG. 3 illustrates the structure of an example frame according to the 802.22 WRAN draft standard. With respect to FIG. 2, the vertical axis represents logical numbers for different subcarriers. Each value of the index 's' represents a different subcarrier. The horizontal axis represents symbol numbers. Each value of the index 'k' represents a different symbol. Thus, for example, in UL burst #1, a plurality of subcarriers is allocated for a plurality of symbols. UL burst #1 may be allocated to the CPE 185. Other UL bursts may be allocated to other CPEs (not shown).

In the DS, preambles are used at the beginning or middle of the symbol transmissions. This is illustrated in FIGS. 2 and 3. These preambles serve the purpose of channel estimation and correction. In data OFDM symbols intended for data transmission, values known to both transmitter (BS) and receivers (CPEs) are also transmitted on specific subcarriers (also known to both BS and CPEs) to provide better channel tracking and correction capabilities. These values are called pilots, and the corresponding subcarriers are called pilot subcarriers. In the US, in some embodiments, preambles are not transmitted by a CPE to the BS. Instead, the BS may rely on the pilots transmitted by a CPE to estimate the channel. In some cases, pilot can be transmitted on different subcarriers in different symbols.

In order to enhance the ability to estimate and track channel conditions, it may be desirable to ensure that pilots for each of the used subcarriers is received on the US with sufficient frequency. This may be accomplished according to the systems and methods disclosed herein.

Referring again to FIG. 1, the base station 155 comprises a controller 157, a transceiver 159, and storage 161. The controller 157 comprises a processor configured to execute one or more software modules for accomplishing the functionality described herein. The instructions may be stored in storage 161. Storage 161 comprises a non-transitory computer-readable medium. The controller 157 is also configured to communicate with the CPE 185 via the transceiver 159.

In one embodiment, the controller 157 is configured to allocate US bursts to the one or more CPEs. As part of the allocation process for each US burst, the controller 157 allocates a particular set of subcarriers for a particular number of symbols. Examples of these US bursts in the US sub frame can be seen in FIGS. 2 and 3. As shown in FIGS. 2 and 3, in a US sub-frame, a particular subcarrier can be split between multiple bursts. Thus, a portion of the symbols corresponding to that subcarrier in that US sub-frame can be allocated to one CPE while the remaining symbols can be allocated to other CPEs.

In one embodiment, the controller 157 forms US bursts according to certain criteria that facilitate detection of channel conditions. In one example, when a particular subcarrier is included in a burst, the controller 157 is configured to allocate at least a minimum number of symbols on that subcarrier to that burst. In one embodiment, the minimum number of symbols allocated to the subcarrier in the burst is sufficient to allow two or more pilots to be included on the subcarrier in that burst. Advantageously, allocating symbols in this manner facilitates improved channel tracking. For example, in some embodiments, one pilot per subcarrier is sufficient for channel estimation but not sufficient for channel tracking.

In some systems, CPEs, such as the CPE 185 are configured to insert pilots in US bursts every nth symbol on each subcarrier, where n is an integer. In one embodiment, the base station controller 157 allocates at least m*n symbols for each subcarrier in an US burst, where m is a positive integer, such as 2. For example in the IEEE 802.22 draft v4.0 standard, a pilot is transmitted every 7 symbols for each subcarrier in the US. Thus, in one embodiment, the controller 157 is configured to allocate a minimum of 14 symbols in each subcarrier in a burst. It will be appreciated that other values of m and n may be used. For example, m may be equal to or greater than two. Advantageously, by allocating sufficient symbols per subcarrier in each US burst, the BS can facilitate improved channel condition monitoring.

Referring again to FIG. 1, the CPE 185 comprises a controller 187, a transceiver 189, and storage 191. The controller 187 comprises a processor configured to execute one or more software modules for accomplishing the functionality described herein. The instructions may be stored in storage 191. Storage 191 comprises a non-transitory computer-readable medium. The controller 187 is also configured to communicate with the BS 155 via the transceiver 189.

The CPE 185 communicates on the US by sending US bursts at its allotted time. As described above, an US burst may comprise a plurality of symbols on a plurality of subcarriers. In one embodiment, the controller 187 is configured, to use at least two symbols per subcarrier in the US burst to send pilots to the BS 155. It will be appreciated that other numbers of pilots per subcarrier per burst may be used. For example 2 or more pilots may be used. Advantageously, by transmitting multiple pilots per subcarrier per burst the CPE 185 can facilitate improved channel estimation and tracking.

In one embodiment the BS assigns US bandwidth to the CPEs. These assignments are sent to the CPEs in the DS. When the BS assigns US bandwidth, it always assigns US bandwidth in increments which allow for at least two symbols per subcarrier. Therefore, even if a CPE only requested (or needed) an amount of bandwidth which would allow for transmitting less than two symbols per subcarrier, the BS would increase the allocation of bandwidth to that CPE. This can be implemented as part of the BS frame building process.

Figure 4:
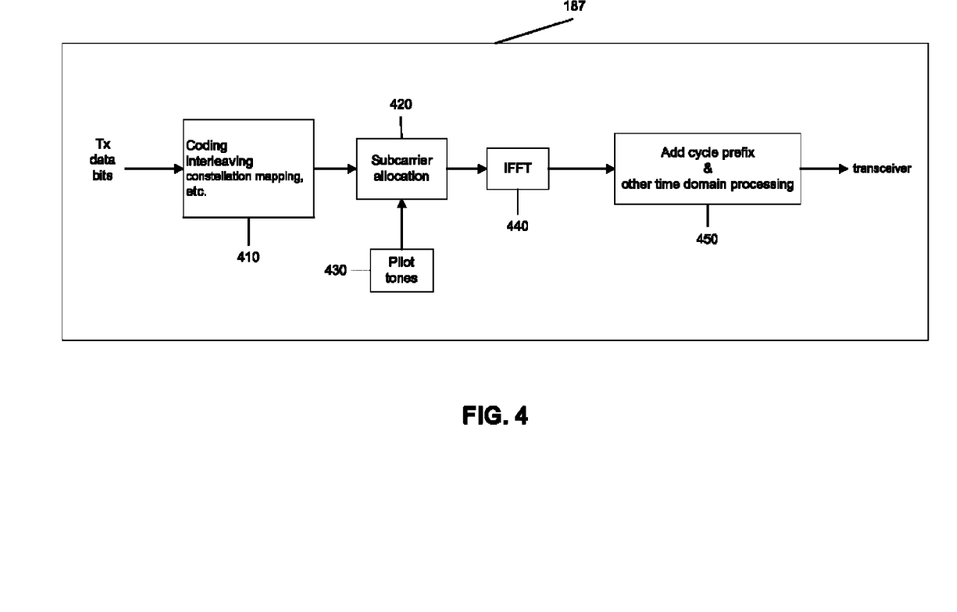
FIG. 4 is a functional module diagram of selected functions of the controller of a user terminal.

FIG. 4 is a functional module diagram of selected functions of the controller 187. In general, the controllers include the appropriate hardware, firmware and/or software to implement the functions described herein. The modulation module 410 performs modulation on the data to be transmitted. Modulation can include coding, interleaving, constellation mapping and forward error correction. The output of the modulation module is provided to the subcarrier allocation module 420 where the output from the modulation module is multiplexed (converted from serial into the number of parallel streams equal to the number of assigned subcarriers) and pilots are inserted into each of the subcarrier streams represented by module 430. In one embodiment two pilots are inserted into each subcarrier stream. The output from the subcarrier allocation module 420 is provided to the Inverse Fast Fourier Transform (IFFT) module 440 which converts that output to a time-domain signal. The output from the IFFT module 440 is provided to the cyclic prefix module 450 which adds a cyclic prefix to the beginning of each symbol from the IFFT module. In addition, cyclic prefix module 450 can also perform other time domain processing of the signal. The output of the prefix module 450 is the provided to the transceiver.

As described above, the controller 157 of the BS 155 may allocate sufficient symbols per subcarrier per burst to allow the controller 187 of the CPE 185 to send multiple pilots per subcarrier per burst to the BS 185. In one embodiment, the controller 157 is configured to compare the two or more pilots per subcarrier per burst and to perform one or more actions based on the comparison. In one example, the controller 157 calculates a channel transfer function estimate based on each pilot for a particular subcarrier. The controller 157 then compares the estimates to determine if the channel has changed over the course of the burst. In one embodiment, the controller 157 tracks the channel based on the comparison. For example, if the comparison indicates that the channel is changing within the burst, the controller 157 adjusts the channel transfer function over time for that subcarrier. In this way, more accurate channel estimate can be used for channel equalization at the receiver to improve the accuracy of received data. Advantageously, in certain embodiments multiple pilots are used for channel transfer function tracking. A channel transfer function estimate can be made based on each pilot, but this estimate is accurate only for that symbol. If the channel is changing over time, then the channel transfer function changes over time. With multiple pilots, this change can be detected and tracked, and channel transfer function for the data symbols can be estimated more accurately based on methods such as interpolation of channel transfer function obtained using pilots. Thus, by comparing multiple pilots per subcarrier per burst, the BS 155 can improve performance.

Figure 5:
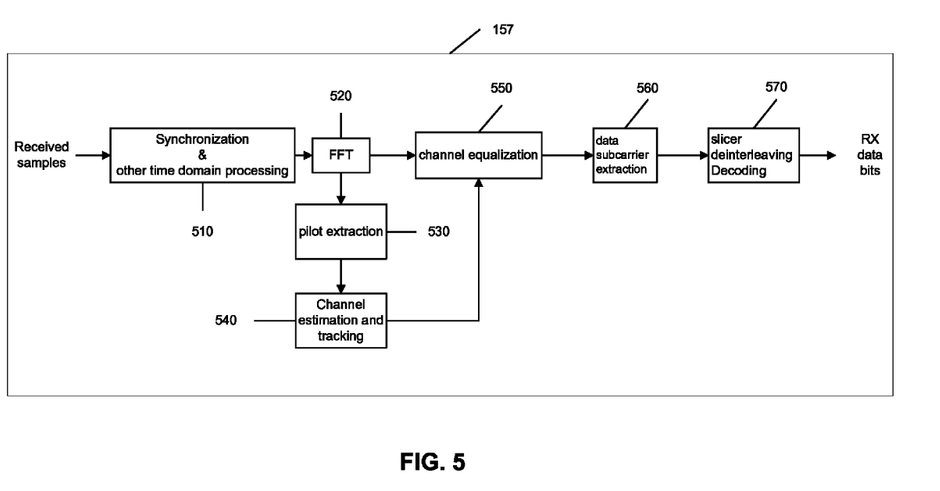
FIG. 5 is a functional module diagram of selected functions of the controller of a base station.

FIG. 5 is a functional module diagram of selected functions of the controller 157. In general, the controllers include the appropriate hardware, firmware and/or software to implement the functions described herein. The synchronization and time domain processing module 510 performs time domain processing, including synchronization, on the samples received from the transceiver 159 of the base station. The Fast Fourier Transform (FFT) transforms the output from the time domain processing module 510 into the frequency domain. The output of the FFT module 520 is provided to the pilot extraction module 530 which extracts the pilots.

In a preferred embodiment the controller 157 of the BS 155 allocated to each CPE sufficient symbols per subcarrier per burst to allow the controller 187 of each of the CPEs to send multiple pilots per subcarrier per burst to the BS 185. In other words, each subcarrier transmitted by a CPE has at least two pilots per burst. The channel estimation module 540 receives the extracted pilots from the pilot extraction module 530 and compares the two or more pilots per subcarrier per burst. In one example, the channel estimation module 540 calculates a channel transfer function estimate based on each pilot for a particular subcarrier. The channel estimation module 540 then compares the estimates to determine if the channel has changed over the course of the burst. The channel estimation module 540 also tracks the channel based on the comparison. For example, if the comparison indicates that the channel is changing within the burst, the channel estimation module 540 adjusts the channel transfer function over time for that subcarrier. In this way, a more accurate channel estimate can be used for channel equalization at the receiver to improve the accuracy of the received data. A channel transfer function estimate can be made based on each pilot, but this estimate is accurate only for that symbol. If the channel is changing over time, then the channel transfer function changes over time. With multiple pilots, this change is detected and tracked, and the channel transfer function for the data symbols can be estimated more accurately using methods such as interpolation of the channel transfer function obtained using the pilots. Thus, by comparing multiple pilots per subcarrier per burst, the BS 155 can improve performance.

Various illustrative implementations of the present invention have been described. However, one of ordinary skill in the art will see that additional implementations are also possible and within the scope of the present invention. Accordingly, the present invention is not limited to only those implementations described above. Those of skill in the art will appreciate that the various illustrative modules or blocks and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations.

We claim:

1. A wireless device which sends data to user terminals on a down stream and receives data from user terminals on an up stream, the device comprising:
   a controller configured to
      allocate up stream bursts to one or more of a plurality of user terminals, the controller allocating a particular set of subcarriers for a particular number of symbols for each of the one or more user terminals and allocating sufficient symbols per subcarrier per burst to allow each of the one or more user terminals to send two or more pilots per subcarrier per burst,
      calculate a channel transfer function estimate based on each pilot received for each subcarrier during a burst and compare the estimates over the burst to determine if the channel has changed over the course of the burst, and
      if the comparison indicates that the channel is changing within the burst, the controller adjusts the channel transfer function estimate over time for that subcarrier: and
   a transceiver which transmits information to the plurality of user terminals using orthogonal frequency division multiple access (OFDMA) and receives two or more pilots per subcarrier per burst from the one or more of the plurality of user terminals.

2. The device of claim 1 wherein each of the one or more user terminals is configured to transmit a pilot on each subcarrier at a predetermined frequency and the controller is configured to allocate at least a number of symbols for each subcarrier in an up stream burst, where the predetermined frequency is repeated at least twice.

3. A method for operating a base station communicating with one or more user terminals in an orthogonal frequency division multiple access (OFDMA) system where the one or more user terminals are configured to insert pilots in up stream bursts every nth symbol on each subcarrier of a channel, where n is an integer, the method comprising:
   identifying a needed amount of up stream bandwidth to be allocated to a user terminal;
   determining which subcarriers and the a number of symbols per subcarrier to be allocated to meet the identified need;
   allocating at least m * n symbols for each determined subcarrier in an up stream US burst, where m is a positive integer greater than or equal to 2;
   transmitting a message to the user terminal, the message identifying the determined subcarriers and the number of symbols allocated for each determined subcarrier;
   receiving a transmission from the user terminal on the determined subcarriers, the transmission including two or more pilots on each of the determined subcarriers;
   calculating a channel transfer function estimate based on each pilot received on each determined subcarrier during a burst;
   comparing the channel transfer function estimates over the burst to determine if the channel has changed over the course of the burst; and
   when the comparison indicates that the channel is changing within the burst, adjusting the channel transfer function estimate over time for the determined subcarrier.

4. The method of claim 3 wherein identifying a needed amount of up stream bandwidth includes receiving a bandwidth request from the user terminal.

5. A method for operating a base station communicating with one or more user terminals in an orthogonal frequency division multiple access (OFDMA) system where the one or more user terminals are configured to insert pilots in upstream bursts with a predetermined frequency on each subcarrier of a channel, where n is an integer, the method comprising:
   identifying a needed amount of upstream bandwidth to be allocated to a user terminal;
   determining which subcarriers and a number of symbols per subcarrier to be allocated to meet the identified need in a burst;
   allocating, for the user terminal, a set of subcarriers and a number of symbols for each member of the set of subcarriers, sufficient symbols per subcarrier per burst being allocated to allow user terminal to send two or more pilots per subcarrier per burst;
   transmitting a message to the user terminal, the message identifying the allocated subcarriers and the number of symbols allocated for each subcarrier;
   receiving a transmission burst from the user terminal on the allocated subcarriers, the transmission including two or more pilots per burst on each of the allocated subcarriers;
   extracting two or more pilots from a subcarrier in a the burst;

comparing a transfer function estimate for each of the two or more pilots to determine if the channel has changed; and when the comparison indicates that the channel is changing within the burst, adjusting the channel transfer function estimate over time for that subcarrier.

6. The method of claim 5 wherein the user terminal is configured to transmit a pilot on each subcarrier every n symbols and allocating further comprises allocate at least m * n symbols for each subcarrier allocated to the user terminal in the burst, where m is a positive integer.

* * * * *